United States Patent
Cho et al.

(10) Patent No.: US 7,912,891 B2
(45) Date of Patent: Mar. 22, 2011

(54) HIGH SPEED LOW POWER FIXED-POINT MULTIPLIER AND METHOD THEREOF

(75) Inventors: Sang-In Cho, Daejon (KR); Cheol-Ho Shin, Daejon (KR); Kyu-Min Kang, Daejon (KR); Sung-Woo Choi, Daejon (KR); Sang-Sung Choi, Daejon (KR); Jin-Gyun Chung, Jeonbuk (KR); Yong-Eun Kim, Jeonbuk (KR)

(73) Assignee: Electronics and Telecommunications Research Institute, Daejon (KR)

( * ) Notice: Subject to any disclaimer, the term of this patent is extended or adjusted under 35 U.S.C. 154(b) by 1138 days.

(21) Appl. No.: 11/636,242

(22) Filed: Dec. 8, 2006

(65) Prior Publication Data

US 2007/0180015 A1  Aug. 2, 2007

(30) Foreign Application Priority Data

Dec. 9, 2005 (KR) .................. 10-2005-0120464
Jun. 19, 2006 (KR) .................. 10-2006-0055076

(51) Int. Cl.
*G06F 7/52* (2006.01)
(52) U.S. Cl. ..................... 708/625; 708/620
(58) Field of Classification Search ........... 708/620–632
See application file for complete search history.

(56) References Cited

U.S. PATENT DOCUMENTS

| | | | | |
|---|---|---|---|---|
| 4,868,778 A | * | 9/1989 | Disbrow | 708/625 |
| 5,255,216 A | * | 10/1993 | Blanz et al. | 708/625 |
| 5,530,664 A | * | 6/1996 | Tsubata et al. | 708/625 |
| 5,841,684 A | * | 11/1998 | Dockser | 708/625 |
| 5,958,000 A | | 9/1999 | Jiang | |
| 6,223,197 B1 | * | 4/2001 | Kosugi | 708/620 |
| 6,438,569 B1 | | 8/2002 | Abbott | |
| 7,024,445 B2 | * | 4/2006 | Qi | 708/628 |
| 7,769,797 B2 | * | 8/2010 | Cho et al. | 708/625 |
| 2001/0037352 A1 | * | 11/2001 | Hong | 708/625 |
| 2003/0120694 A1 | * | 6/2003 | Qi | 708/628 |
| 2005/0050134 A1 | | 3/2005 | Winterrowd | |

FOREIGN PATENT DOCUMENTS

| | | |
|---|---|---|
| JP | 09-097166 | 4/1997 |
| KR | 1997-0029021 | 6/1997 |
| KR | 1020000061675 | 10/2000 |
| KR | 1020000066326 | 11/2000 |

(Continued)

OTHER PUBLICATIONS

Author: Ferguson et al.; Title: "A Multiplier with Redundant Operands"; Date: 1999; URL: http://ieeexplore.ieee.org/search/srchabstract.jsp?tp=&arnumber=831921.*

(Continued)

*Primary Examiner* — Chat C Do
*Assistant Examiner* — Matthew Sandifer
(74) *Attorney, Agent, or Firm* — Ladas & Parry LLP

(57) ABSTRACT

Provided are a high speed and low power fixed-point multiplier and method thereof. The multiplier includes: a partial product calculation unit for dividing input data into a plurality of bit groups, each bit group having a predetermined number of bits, generating partial products by independently multiplying a fixed coefficient for each bit group, and summing partial products included in a corresponding bit group, to thereby generate a summed partial products; and an adding unit for adding the summed partial products of each bit group generated from the partial product calculation unit.

7 Claims, 4 Drawing Sheets

FOREIGN PATENT DOCUMENTS

| | | |
|---|---|---|
| KR | 1019990003926 | 3/2001 |
| KR | 1020060044102 | 5/2006 |

OTHER PUBLICATIONS

Author: Huang et al.; Title: "High-Performance Low-Power Left-to-Right Array Multiplier Design"; Date: Mar. 2005; URL: http://arith.cs.ucla.edu/publications/HuangErc-LowPowMult-TC05.pdf.*

Hu, A. et al., "Comparison of constant coefficient multipliers for CSD and Booth recoding," The 14th International Conference on Microelectronics, pp. 66-69, Dec. 2002.*

Pai, Cheng-Yu et al., "Low-power constant-coefficient multiplier generator," 14th Annual IEEE International ASIC/SOC Conference, Proceedings. pp. 185-189, 2001.*

Al-Khalili, A.J. et al., "32-bit constant (k) coefficient multiplier," Proceedings of IEEE Region 10 International Conference on Electrical and Electronic Technology, vol. 1, pp. 306-308, 2001.*

Korean Notice of Patent Grant dated Sep. 27, 2007 for the corresponding application KR 10-2006-0055076.

Sang-Min Hong et al, "A 32x32-b Multiplier Using A New Method to Reduce a Compression Level of Partial Products" The Paper of Electronic Engineering Conference, vol. 40, No. 6. pp. 69-80, Jun. 2003.

* cited by examiner

FIG. 1
(RELATED ART)

| | | | | | | | | 110 — | X[7] | X[6] | X[5] | X[4] | X[3] | X[2] | X[1] | X[0] |
|---|---|---|---|---|---|---|---|---|---|---|---|---|---|---|---|---|
| | | | | | | | 120 — | 1 | 0 | -1 | 0 | -1 | 0 | 1 | 0 | 1 | 0 |

| 1 | 1 | 1 | 1 | 1 | 1 | 1 | 1 | -X[7] 1 | X[6] | X[5] | X[4] | X[3] | X[2] | X[1] | X[0] | | |
|---|---|---|---|---|---|---|---|---|---|---|---|---|---|---|---|---|---|
| | 1 | 1 | 1 | 1 | 1 | 1 | -X[7] 1 | X[6] | X[5] | X[4] | X[3] | X[2] | X[1] | X[0] | —131 | 130 | |
| | | 1 | 1 | 1 | 1 | X[7] 1 | -X[6] | -X[5] | -X[4] | -X[3] | -X[2] | -X[1] | -X[0] 1 | —132 | | | |
| | | | 1 | 1 | X[7] 1 | -X[6] | -X[5] | -X[4] | -X[3] | -X[2] | -X[1] | -X[0] 1 | —133 | | | | |
| | | -X[7] 1 | X[6] | X[5] | X[4] | X[3] | X[2] | X[1] | X[0] | —134 | | | | | | | |

| | | | | | | | | 140 — | -X[7] | X[6] | X[5] | X[4] | X[3] | X[2] | X[1] | X[0] | |
| | | | | | | | | -X[7] | X[6] | X[5] | X[4] | X[3] | X[2] | X[1] | X[0] | —141 | |
| | | | | | | | X[7] | -X[6] | -X[5] | -X[4] | -X[3] | -X[2] | -X[1] | -X[0] | —142 | | |
| | | | | | | | X[7] | -X[6] | -X[5] | -X[4] | -X[3] | -X[2] | -X[1] | -X[0] | —143 | | |
| | | | | | | -X[7] | X[6] | X[5] | X[4] | X[3] | X[2] | X[1] | X[0] | —144 | | | |
| | | | | | | 1 | | 1 | | 1 | 1 | 1 | | 1 | —145 | | |

| P[16] | P[15] | P[14] | P[13] | P[12] | P[11] | P[10] | P[9] | P[8] | P[7] | P[6] | P[5] | P[4] | P[3] | P[2] | P[1] | P[0] |
|---|---|---|---|---|---|---|---|---|---|---|---|---|---|---|---|---|

150

HIGH SPEED LOW POWER FIXED-POINT MULTIPLIER AND METHOD THEREOF

FIELD OF THE INVENTION

The present invention relates to a high speed and low power fixed-point multiplier and method thereof; and, more particularly, to a high speed and low power fixed-point multiplier and method thereof, which reduces a hardware area and a consumption power, and increase an operational speed by dividing input bits into a plurality of bit groups having a predetermined size, e.g., 8-bit input bit into 4-bit groups, calculating a partial product for each input group and adding the calculated partial product.

DESCRIPTION OF RELATED ART

Recently, many communication systems need a data transfer rate of a high speed such as dozens to hundreds Mbps and a conversion of the high speed data from the analog signal into a digital signal in real time. A multiplier occupies most area and power consumption of hardware in a processor which processes a digital signal. In order to process a digital signal by low power consumption in a small hardware area, it is necessary to embody a multiplier efficiently.

In particular, a fixed-point multiplier means a multiplier which multiplies a certain input signal by the same coefficient. Since the coefficient of the fixed-point multiplier is fixed to a predetermined value, the fixed-point multiplier is embodied more efficiently than a variable-point multiplier.

In general, the fixed-point multiplier uses a canonic sign digit (CSD) algorithm for reducing non-zero bit, and the Wallace-tree algorithm as a scheme for calculating a partial product.

The Wallace-tree algorithm performs an adding calculation by a group of two or three partial products and then the added partial products are shifted to a next state. In the next stage, the Wallace-tree algorithm again performs an adding calculation by a group of two or three added partial products. The CSD algorithm and Wallace-tree algorithm will be described in details referring to FIGS. 1 and 2.

FIG. 1 is a diagram showing a partial product generation scheme in a general fixed-point multiplier.

Assuming that an input bit (input data) 110 has eight bit and a fixed coefficient 120 has ten bit, the fixed coefficient 120 uses the CSD type in order for rapid calculation.

If the CSD algorithm is used, the number of partial products 130 to 134 is reduced according to a reduction of non-zero bit. Since partial products take place as many as the non-zero bit of the fixed coefficient in the general fixed-point multiplier, the number of elements in the hardware is reduced and an operation speed is increased according to reduction of the number of non-zero bits.

If a compensation vector 145 for expanding a code is included in the last group independently, the compensation vector 145 does not need to be added afterward.

If an addition calculation for the partial products of "140" to "145" is performed, the multiplication result indicated by "150" is obtained finally.

FIG. 2 is a diagram describing a fixed coefficient multiplication calculation method using a conventional Wallace-tree algorithm.

The Wallace-tree algorithm is used for increasing a calculation speed in a fixed-point multiplier. The Wallace-tree algorithm reduces the number of partial products by repeating a process which obtains sum and carry values of a partial product group of two lines indicated by "260" or three lines indicated by "240" and "250". When the partial product having two lines indicated by 270 is remained through the repeated process, the Wallace-tree algorithm obtains a multiplication result value indicated by 280 through a ripple carry adder.

If partial products of three lines indicated by "240" are added, the result is represented as two upper lines indicated by "250". If partial products of two lines indicated by 241 are added, the result is represented as a lower line indicated by "251". If partial products of three lines indicated by "250" are added, the result is represented as three lines indicated by "260", "261" and "262".

If the three lines indicated by "260", "261" and "262" are added, the result is represented as two lines indicated by "270", "271", and "272".

Since the Wallace-tree algorithm is capable of performing a parallel process of partial products, the Wallace-tree algorithm provides an improved performance in case of many partial products to be processed.

However, in case of using a conventional Wallace-tree algorithm for calculating partial products, since a plurality of full adders and half adders are used for calculating the partial products in the fixed-point multiplier, the Wallace-tree algorithm has problems that a hardware area, power consumption and a delay time are increased.

SUMMARY OF THE INVENTION

It is, therefore, an object of the present invention to provide a high speed low power fixed-point multiplier and method thereof, which reduces a hardware area and a consumption power and increase an operational speed by dividing input bit into a plurality of bit groups having a predetermined size, for example, 8-bit input bit into 4-bit groups, calculating a partial product for each input group and adding the calculated partial product.

In accordance with one aspect of the present invention, there is provided a high speed and low power fixed-point multiplier, including: a partial product calculation unit for dividing input data into a plurality of bit groups, each bit group having a predetermined number of bits, generating partial products by independently multiplying a fixed coefficient for each bit group, and summing partial products included in a corresponding bit group, to thereby generate a summed partial products; and an adding unit for adding the summed partial products of each bit group generated from the partial product calculation unit.

In accordance with another aspect of the present invention, there is provided a multiplying method using a high speed and low power fixed-point multiplier, including the steps of: a) dividing input data into a plurality of bit groups, each bit group having a predetermined number of bits; b) generating partial products by independently multiplying a fixed coefficient by each bit group which is divided in the step a); c) summing the partial products included in each corresponding bit group, to thereby generate a summed partial products; and d) generating a final multiplying result by adding the summed partial products for each bit group which is generated in the step c).

The other objectives and advantages of the invention will be understood by the following description and will also be appreciated by the embodiments of the invention more clearly. Further, the objectives and advantages of the invention will readily be seen that they can be realized by the means and its combination specified in the claims.

BRIEF DESCRIPTION OF THE DRAWINGS

The above and other objects and features of the instant invention will become apparent from the following description of preferred embodiments taken in conjunction with the accompanying drawings, in which:

FIG. 1 shows a partial product generation scheme in a general fixed-point multiplier;

DETAILED DESCRIPTION OF THE INVENTION

Other objects and aspects of the invention will become apparent from the following description of the embodiments with reference to the accompanying drawings, which is set forth hereinafter.

Figure 2:
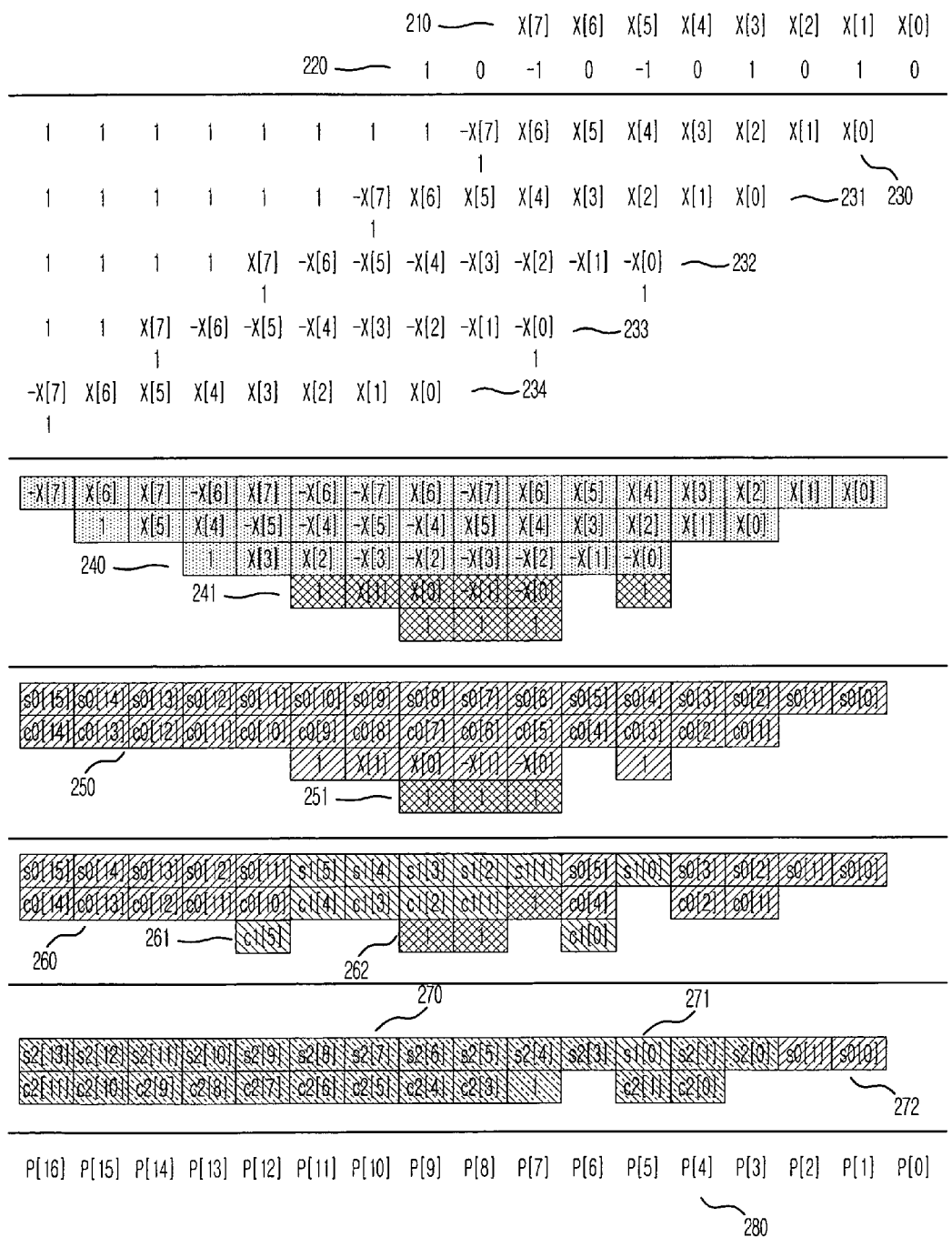
FIG. 2 is a diagram describing a fixed coefficient multiplication calculation method in accordance with a conventional Wallace-tree algorithm.
Figure 3:
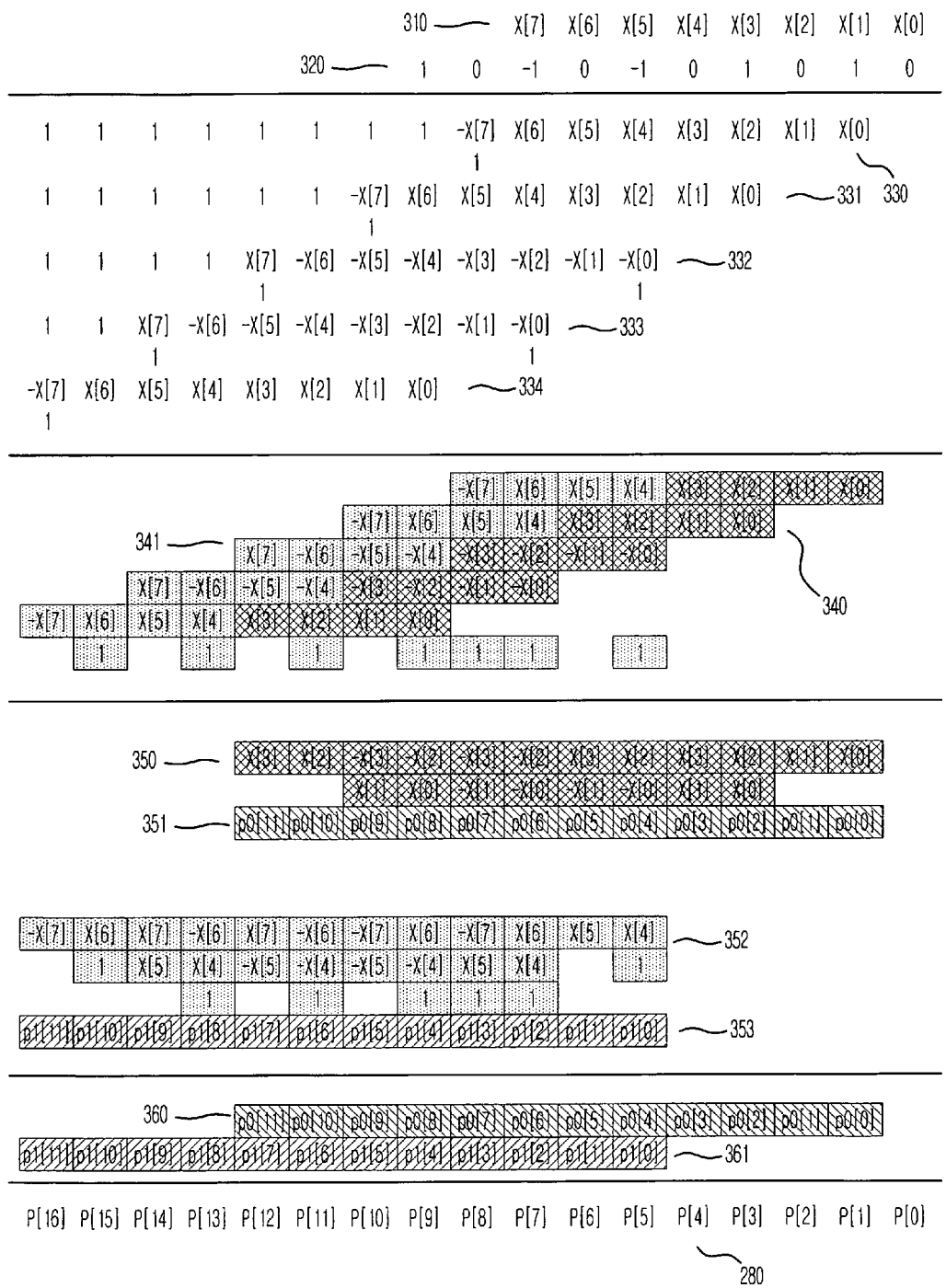
FIG. 3 is a diagram illustrating a partial product calculation scheme in a high speed and low power fixed-point multiplier in accordance with an embodiment of the present invention.

FIG. 3 is a diagram illustrating a partial product calculation scheme in a high speed and low power fixed-point multiplier in accordance with an embodiment of the present invention.

As shown in FIG. 3, a partial product of the present invention is represented as an input variable in a fixed-point multiplier, though in the general multiplier, the partial product is expressed as AND operation of the input bit and coefficient of the multiplier.

Hereinafter, an embodiment of the present invention will be described in the case that a fixed coefficient of the fixed-point multiplier is cos [π/4].

cos [π/4] is represented as "0.101101010" in a binary number having ten bit resolution. If a fixed coefficient is changed into a CSD type for reducing a calculation quantity of the fixed-point multiplier, the "0.101101010" becomes "10-10-10101" 320. If an input value of the fixed-point multiplier is eight bit, X[7:0] 310, a partial product 330 to 334 is represented as one of variables of X[7:0].

A group X[3:0] is indicated by "340" and "350". If a sum of variables X[3:0] is represented as p0[11:0] 351, p0[11:0] is expressed as an equation of the variable X[3:0]. The equation may be obtained by the Karnaugh map, or by a computer using Quine-McCluskey algorithm for saving a time and an effort.

Meanwhile, a group X[7:4] is indicated by "341" and "352". A sum of variables X[7:0] is represented as p1[11:0] 353.

If a compensation vector is included in the last group independently when an area X[7:4] is grouped, for the code expansion, the compensation vector 145 does not need to be added afterward. The calculated result of X[7:4] including the compensation vector is indicated by "343". A final result 370 is obtained by adding the calculated partial products 351 and 352 based on the Wallace-tree algorithm.

In the conventional multiplier, a height of the partial product is equal to the number of non-zero bits. Accordingly, a plurality of full adders are used when the calculation is performed based on Wallace-tree algorithm.

Since the height of a partial product is X/N (X=the number of input bit, N=the number of grouping variables) in the present invention, an area of a hardware is reduced when X/N is less than the number of non-zero bit. When the length of the coefficient of the multiplier is long and the number of the input bits is small, or a ratio of the number of non-zero bits to the number of zero bits is larger than 0.3, the area of the hardware is reduced more effectively.

However, if the number of new partial products to be generated in the case of the partial products is larger than the number of partial products in the case of non-grouping the partial products, the efficiency is decreased.

As N is increased, the height of partial products is smaller. However, since a circuit for new partial products is complicated, it is preferable that N is two in the case that an input bit is eight bit.

Hereinafter, a high speed and low power fixed coefficient multiplication scheme performed in a high speed and low power fixed-point multiplier will be described.

Figure 4:
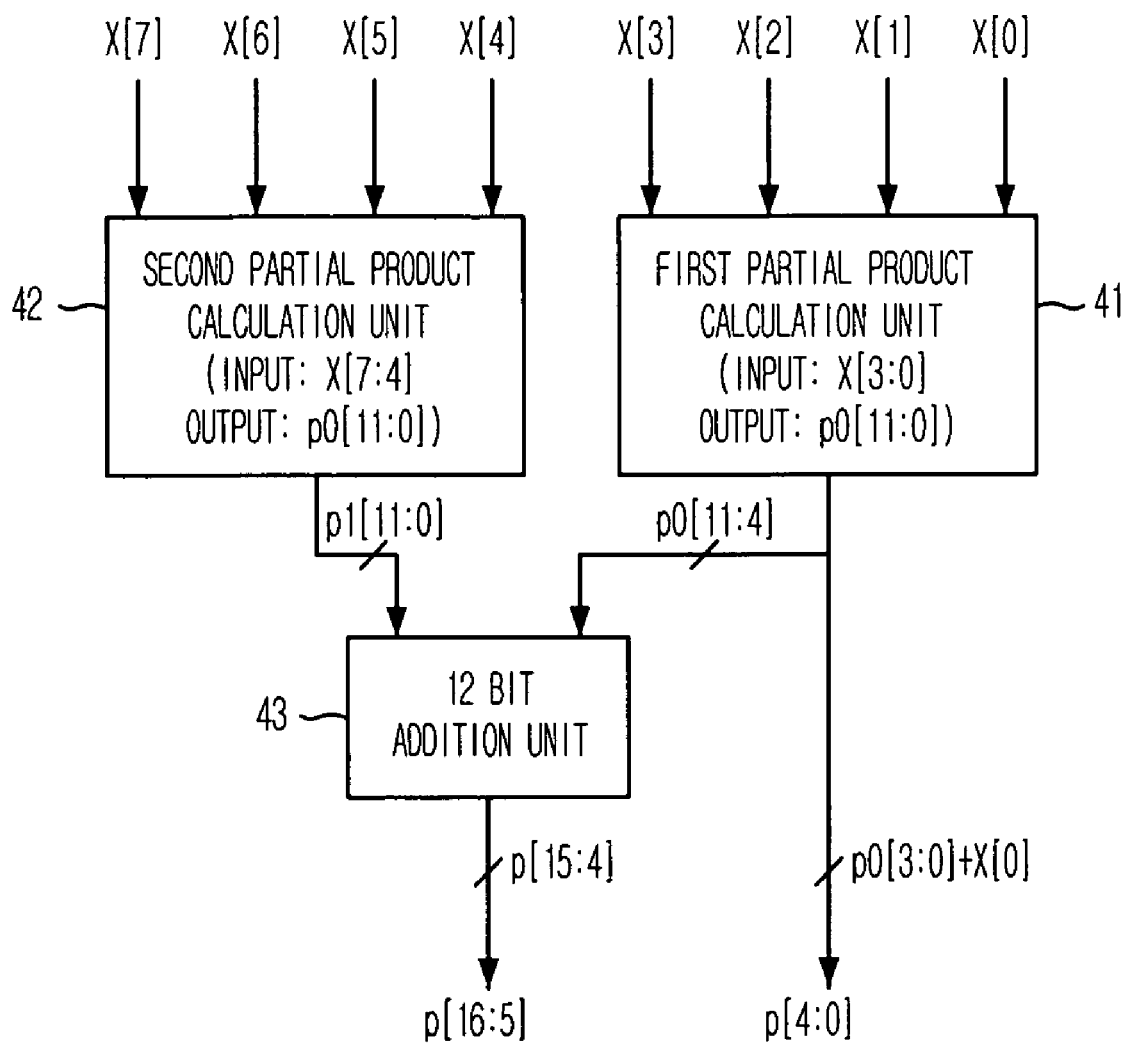
FIG. 4 is a block diagram illustrating a high speed and low power fixed-point multiplier in accordance with the present invention.

FIG. 4 is a block diagram illustrating a high speed and low power fixed-point multiplier in accordance with the present invention.

In the case that an input bit is eight bit, if N is two such that the number of bits in each bit group is four, a high speed and low power fixed-point multiplier in accordance with an embodiment of the present invention includes two partial product calculation units 41 and 42, and a bit adding unit (twelve bit adder) 43.

The input bit (X[7:0]) of the fixed-point multiplier is divided into two bit groups, and is inputted to each corresponding partial product calculation units 41 and 42. That is, X[3:0] (X[0], X[1], X[2], X[3]) and X[7:4] (X[4], X[5], X[6], X[7]) are inputted to each corresponding partial product calculation units 41 and 42.

The first partial product calculation unit 41 is a logic circuit which generates partial products for input data X[3:0], adds the generated partial products and then has an output value of p0[11:0]. The second partial product calculation unit 42 is a logic circuit which generates partial products for input data X[7:4], adds the generated partial products and then has an output value of p1[11:4].

Each of partial product calculation units 41 and 42 generates a plurality of partial products based on the canonic sign digit (CSD) algorithm, and adds the generated partial products based on the Wallace-tree algorithm. The first and second partial product calculation units 41 and 42 are operated in parallel.

The bit adding unit (twelve bit adder) 43 outputs finally p1[15:4] by adding p1[11:0], which is output of the second partial product calculation unit 42, and p0[11:4], which is output of the first partial product calculation unit 41. Since p0[3:0] of output values of the first partial product calculation unit 41 does not have an object to be added, the p0[3:0] is used as an output of the fixed-point multiplier.

A final output value p[16:0] of the fixed-point multiplier in accordance with an embodiment of the present invention includes p0[3:0], which is output values of the first partial product calculation unit 41, p[4:0] having an input bit (X[0]), and p[15:4] of output values of the bit adding unit (twelve bit adder) 43.

On the other hand, in the case that a sixteen bit adder instead of the twelve bit adder is used as the bit adding unit 43, all output values (p0[11:0]) of the first partial product calculation unit 41 is received by the bit adding unit 43.

Since the number of partial products to be added is reduced by grouping and calculating partial products of the fixed-point multiplier in accordance with an embodiment of the present invention, a power consumption and a hardware of the fixed-point multiplier are reduced, and an operation speed of the fixed-point multiplier is increased by reduction of a time delay and increment of a calculation speed.

The high speed and low power fixed-point multiplier and multiplying method using the same in accordance with an embodiment of the present invention reduce the number of hardware and power consumption, and increase an operational speed by efficiently implementing a multiplier in a hardware for a digital signal process.

For example, input data of a fixed-point multiplier has three bits and twelve bits, and a coefficient of the fixed-point multiplier is cos [π/4] and has ten bits. The comparison results of a hardware area, power consumption and an operational speed between a conventional method and the present invention are described as following table.

TABLE

|  | Coefficient: 10 bit cos[π/4] Input: three bit | | | Coefficient: 10 bit cos[π/4] Input: twelve bit | | |
| --- | --- | --- | --- | --- | --- | --- |
|  | Conventional method | Present invention | Gain (%) | Conventional method | Present invention | Gain (%) |
| Area (cell) | 78.74 | 21.6 | 78.74 | 248 | 172 | 20.6 |
| Consumption power (mW) | 6.61 | 2.95 | 55.37 | 24.73 | 18 | 27.21 |
| Speed (ns) | 3.30 | 0.76 | 74.9 | 4.70 | 4.41 | 6.17 |

As shown in the above table, in the case that X/N is less than the number of non-zero bit, the present invention has a further improved effect than a conventional method in an area, consumption power, and operational speed.

The method of the present invention as mentioned above may be implemented by a software program that is stored in a computer-readable storage medium such as CD-ROM, RAM, ROM, floppy disk, hard disk, optical magnetic disk, or the like. This process may be readily carried out by those skilled in the art; and therefore, details of thereof are omitted here.

The present application contains subject matter related to Korean patent application No. 2005-120464 and 2006-55076, filed with the Korean Intellectual Property Office on Dec. 9, 2005 and Jun. 19, 2006, respectively, the entire contents of which are incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. A high speed and low power fixed-point multiplier for performing multiplication of an input data multiplicand by a fixed coefficient multiplier, comprising:

partial product calculation logic circuitry for dividing the input data into a plurality of bit groups, each bit group having a predetermined number of bits, generating partial products by independently multiplying the fixed coefficient for each bit group, and summing partial products included in a corresponding bit group, to thereby generate summed partial products; and adding circuitry for adding the summed partial products of each bit group generated from the partial product calculation logic circuitry, wherein the number of bits of the input data divided by the number of the plurality of bit groups is less than a number of non-zero bits of the fixed coefficient, wherein the partial product calculation logic circuitry includes a partial product calculation unit for each of the plurality of bit groups, wherein independently multiplying the fixed coefficient for each bit group is performed by a corresponding partial product calculation unit for each of the respective bit groups, and wherein the partial product units perform the respective multiplications in parallel.

2. The multiplier as recited in claim 1, wherein the partial product calculation logic circuitry includes two partial product calculation units so that the grouping for the input data is performed by a four bit basis if the input data has eight bits.

3. The multiplier as recited in claim 1, wherein the partial product calculation units generate the plurality of partial products based on a canonic sign digit (CSD) algorithm, and adds the plurality of partial products based on a Wallace-tree algorithm.

4. A method of a high speed and low power fixed-point multiplier for performing multiplication of an input data multiplicand by a fixed coefficient multiplier, comprising the steps of:

a) dividing the input data into a plurality of bit groups, each bit group having a predetermined number of bits;

b) generating, by partial product calculation circuitry, partial products by independently multiplying the fixed coefficient by each bit group which is divided in the step a);

c) summing, in the partial product calculation circuitry, the partial products included in each corresponding bit group, to thereby generate summed partial products; and d) generating a final multiplying result by adding, in adding circuitry, the summed partial products for each bit group which is generated in the step c), and wherein the number of bits of the input data divided by the number of the plurality of bit groups is less than a number of non-zero bits of the fixed coefficient, wherein the partial product calculation logic circuitry includes a partial product calculation unit for each of the plurality of bit groups, wherein independently multiplying the fixed coefficient for each bit group is performed by a corresponding partial product calculation unit for each of the respective bit groups, and wherein the partial product units perform the respective multiplications in parallel.

5. The multiplying method as recited in claim 4, wherein in the step a), the input data is divided into individual bit group by four bit basis if the input data has eight bits.

6. The multiplying method as recited in claim 4, wherein in the step b), the plurality of partial products are generated based on a canonic sign digit (CSD) algorithms.

7. The multiplying method as recited in claim 4, wherein in the step c), the partial products are summed based on a Wallace-tree algorithm.

* * * * *